(12) United States Patent
Fuchs et al.

(10) Patent No.: US 11,573,379 B2
(45) Date of Patent: Feb. 7, 2023

(54) LASER WELDING OF OPTICAL FIBERS IN PERFORATED ELEMENTS AND ASSOCIATED OPTICAL ELEMENTS

(71) Applicant: TRUMPF LASER GMBH, Schramberg (DE)

(72) Inventors: Stefan Fuchs, Boehringen (DE); Dominik Bauer, Rottweil (DE); Michael Scharun, Schramberg (DE); Helge Höck, Schramberg (DE); Stefan Baumbach, Oberwolfach (DE); Manuel Schindler, Empfingen (DE); Maike Proßotowicz, Emmerich (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 17/329,332

(22) Filed: May 25, 2021

(65) Prior Publication Data

US 2021/0278603 A1    Sep. 9, 2021

Related U.S. Application Data

(63) Continuation of application No. PCT/EP2019/081441, filed on Nov. 15, 2019.

(30) Foreign Application Priority Data

Nov. 28, 2018   (DE) ............... 10 2018 220 477.2

(51) Int. Cl.
  *G02B 6/38*   (2006.01)
  *C03B 37/15*  (2006.01)
  *G02B 6/032*  (2006.01)

(52) U.S. Cl.
  CPC ............ *G02B 6/3855* (2013.01); *C03B 37/15* (2013.01); *G02B 6/032* (2013.01)

(58) Field of Classification Search
  CPC ............................ G02B 6/3855; C03B 37/15
  See application file for complete search history.

(56) References Cited

U.S. PATENT DOCUMENTS

| 5,250,783 A | 10/1993 | Nishi et al. |
| 8,314,359 B2 | 11/2012 | Bovatsek et al. |

(Continued)

FOREIGN PATENT DOCUMENTS

| CN | 105246637 A | 1/2016 |
| CN | 205439250 U | 8/2016 |

(Continued)

OTHER PUBLICATIONS

DE Office Action in German Appln. No. 102018220445.4, dated Aug. 27, 2019, 14 pages (with English translation).

(Continued)

*Primary Examiner* — Omar R Rojas
(74) *Attorney, Agent, or Firm* — Fish & Richardson P.C.

(57) ABSTRACT

Methods, devices, and systems for welding optical fibers and perforated elements by pulsed laser beam are provided. In one aspect, a method includes focusing a pulsed laser beam onto a region of a joining surface formed by an outer circumference of an optical fiber and an inner circumference of a hole of a perforated element, a beam direction of the pulsed laser beam running in an axial direction of the joining surface, and moving a laser focus of the pulsed laser beam in the region axially in or counter to the beam direction to produce at least one weld seam in the region. The optical fiber and the perforated element are locally melted in the region by the pulsed laser beam focused into a material of the optical fiber and a material of the perforated element and are thereby welded to one another.

16 Claims, 3 Drawing Sheets

(56) References Cited

U.S. PATENT DOCUMENTS

| | | | |
|---|---|---|---|
| 9,625,713 B2 | 4/2017 | Helie et al. | |
| 10,300,664 B2 | 5/2019 | Knoll et al. | |
| 10,746,937 B2* | 8/2020 | Butler | B23K 26/0624 |
| 2002/0015568 A1 | 2/2002 | Dahmani et al. | |
| 2005/0195402 A1 | 9/2005 | May et al. | |
| 2013/0008880 A1 | 1/2013 | Ota | |
| 2013/0068384 A1 | 3/2013 | Liu et al. | |
| 2013/0344302 A1 | 12/2013 | Helie et al. | |
| 2014/0291304 A1 | 10/2014 | Mudd, II | |
| 2015/0219860 A1 | 8/2015 | Danley et al. | |
| 2016/0327735 A1 | 11/2016 | Chen et al. | |
| 2016/0368089 A1 | 12/2016 | Grapov et al. | |
| 2021/0276128 A1 | 9/2021 | Bauer et al. | |
| 2021/0278603 A1 | 9/2021 | Fuchs et al. | |

FOREIGN PATENT DOCUMENTS

| | | | |
|---|---|---|---|
| CN | 106414037 A | 2/2017 | |
| CN | 108372362 A | 8/2018 | |
| CN | 108609841 | 10/2018 | |
| DE | 102006042280 | 6/2007 | |
| DE | 102007036671 | 1/2009 | |
| DE | 102010038554 | 2/2012 | |
| DE | 102011081554 | 2/2013 | |
| DE | 102013201968 | 8/2014 | |
| DE | 102015003652 | 9/2016 | |
| DE | 102016116409 | 3/2017 | |
| DE | 102017114002 | 12/2018 | |
| EP | 0531139 | 3/1993 | |
| EP | 0905534 | 3/1999 | |
| EP | 2056144 | 5/2009 | |
| EP | 2915785 A1 | 9/2015 | |
| JP | S63135906 A | 6/1988 | |
| JP | 2005-001172 | 1/2005 | |
| JP | 2010-070388 | 4/2010 | |
| JP | 2017-068052 | 4/2017 | |
| JP | 2017068052 A * | 4/2017 | |
| KR | 101453855 | 10/2014 | |

OTHER PUBLICATIONS

DE Office Action in German Appln. No. 102018220447.0, dated Aug. 27, 2019, 17 pages (with English translation).

DE Office Action in German Appln. No. 102018220477.2, dated Nov. 28, 2018, 24 pages (with English translation).

Itoh et al., "Ultrafast processes for bulk modification of transparent materials," MRS Bulletin, Aug. 2006, 31(8):620-5.

PCT International Search Report and Written Opinion in International Appln. No. PCT/EP2019/080770, dated Feb. 18, 2020, 28 pages (with English translation).

PCT International Search Report and Written Opinion in International Appln. No. PCT/EP2019/081441, dated Mar. 4, 2020, 18 pages (with English translation).

PCT International Search Report and Written Opinion in International Appln. No. PCT/EP2019/081787, dated Feb. 18, 2020, 26 pages (with English translation).

Richter, "Dissertation—Direct laser bonding of transparent materials using ultrashort laser pulses at high repetition rates," Mar. 6, 2014, 123 pages.

CN Office Action in Chinese Appln. No. 201980078564.8, dated Apr. 1, 2022, 13 pages (with English translation).

CN Office Action in Chinese Appln. No. 201980078564.8, dated Aug. 26, 2022, 9 pages (with English translation).

CN Office Action in Chinese Appln. No. 201980078566. 7, dated Jul. 26, 2022, 12 pages (with English translation).

CN Office Action in Chinese Appln. No. 201980078620.8, dated Aug. 24, 2022, 13 pages (with English translation).

* cited by examiner

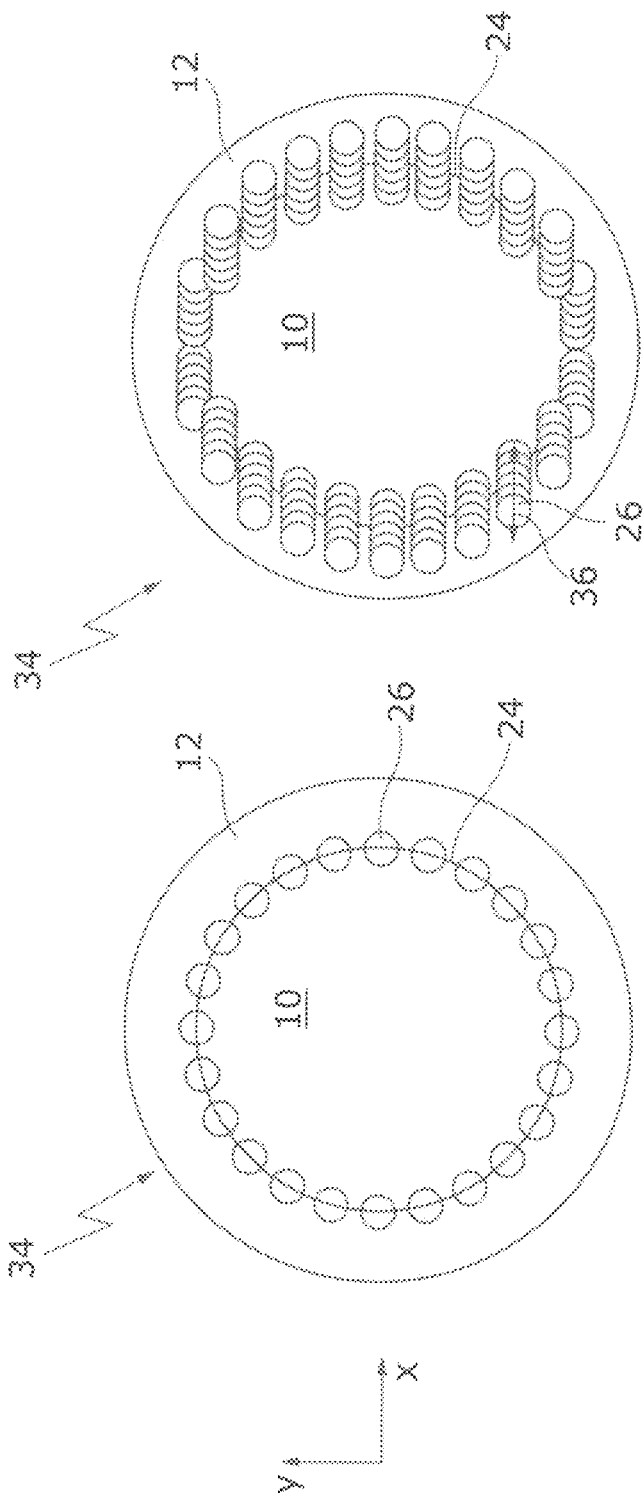

LASER WELDING OF OPTICAL FIBERS IN PERFORATED ELEMENTS AND ASSOCIATED OPTICAL ELEMENTS

CROSS REFERENCE TO RELATED APPLICATIONS

This application is a continuation of and claims priority under 35 U.S.C. § 120 from PCT Application No. PCT/EP02019/081441, filed on Nov. 15, 2019, which claims priority from German Application No. 10 2018 220 477.2, filed on Nov. 28, 2018. The entire contents of each of these priority applications are incorporated herein by reference.

TECHNICAL FIELD

The present disclosure relates to methods, devices, and systems for welding optical fibers, e.g., hollow core fibers, to perforated elements, e.g., composed of glass, by pulsed laser beams, e.g., ultrashort pulse (USP) laser beams.

BACKGROUND

Optical fibers are, for example, step-index or multi-clad fibers, Polymer Cladded Fiber (PCF), or hollow core fibers. Hollow core fibers are passive transport fibers that carry radiation through a hollow core, surrounded by a fine photonic glass structure, e.g., in a kagome configuration. The hollow core enables glass destruction thresholds to be avoided and non-linear effects to be suppressed with the result that higher intensities can be guided. For this purpose, the hollow core can have a vacuum. On the other hand, the hollow interior of the core can also be filled with a gas, such as argon, in a targeted manner.

Perforated elements are, for example, perforated blocks, ferrules/glass sleeves, or perforated discs or perforated caps.

Welding of monolithic connections to the hollow core fiber can be achieved by means of $CO_2$ splicing, for example. In return, however, e.g., the sensitive kagome structure is concomitantly melted, which essentially has a negative influence on the beam quality. Further possibilities for connection are for example adhesive bonding or bracing using an O-ring, both of which may pose strain problems. Adhesives may moreover outgas or age prematurely.

In addition, hollow core fibers necessitate the substantially central positioning of the core over the hole in the perforated element, e.g., a perforated cap, and also a plane alignment of the fiber with the perforated element. This requires for the mounting a high precision and at the same time enough degrees of freedom of adjustment. Accordingly, only very small tolerances are present for the complete process in order to achieve successful welding in which the beam quality is maintained and sufficient strength and/or gas-tightness are/is obtained.

EP 0 905 534 A2 describes the connection of a fiber to a glass sleeve. For this purpose, at the fiber end at the interface between the fiber and glass sleeve, materials of the fiber and the glass sleeve are melted in a ring-shaped fashion and the two workpieces are thus connected.

SUMMARY

In general, the present disclosure provides a fiber-conserving welding methods with improved connection of optical fibers and perforated elements.

In one aspect, the present disclosure features welding methods, where a pulsed laser beam is focused onto the region of a joining surface, the beam direction of the laser beam running in the axial direction of the cylindrical joining surface, and the laser focus in the region of the joining surface is moved axially in or counter to the beam direction of the laser beam to produce at least one weld seam, e.g., an axial or axially parallel weld seam, in the region of the joining surface. In some embodiments, the pulsed laser beam is a USP laser beam that includes laser radiation having pulse durations of less than 50 ps, e.g., less than 1 ps or in the femtoseconds (fs) range.

This welding method can be applied to the welding of hollow core fibers. Hollow core fibers are optical fibers consisting of a hollow fiber core and a fiber cladding.

It has been found that particular requirements are imposed on the welding owing to the small dimensions of the hollow core fiber and owing to the sensitive structure in the interior of the hollow core fiber. Although heat is permitted to be introduced only very locally, the methods according to the present disclosure achieve sufficient strength so that handling of the fiber for further fabrication is possible. It is additionally possible for the weld seam to be positioned precisely and also for the width of the weld seam to be kept narrow. This is crucial for later maintaining the beam quality of the hollow core fiber. The weld seam must not destroy the sensitive inner structure of the hollow core fiber and must therefore be narrower than the fiber cladding. A laser focus diameter of approximately 5-10 µm can be employed; the resulting weld seam then can be approximately 50-70 µm in diameter.

A further advantage of the welding methods according to the present disclosure is the good gas tightness of the connection that can be obtained. This can be important for hollow core fibers, since the latter have to be evacuated for high peak intensities or are filled with gases, e.g., argon, in a targeted manner to achieve spectral broadening for pulse shortening.

Pulsed laser beams, e.g., ultrashort pulsed (USP) laser beams having pulse durations of less than 500 ps or in the femtoseconds range, are increasingly being used for material processing. The special feature of material processing using USP laser radiation resides in the high peak powers/peak intensities of the laser radiation with the workpiece. As a result, extreme thermal imbalances can be produced in the solid, e.g., between electrons and atom/ion cores, which then result in unique removal or formation mechanisms.

The background is the local melting of the material by ultrashort laser pulses. If ultrashort laser pulses are focused into the volume of glass, e.g., quartz glass, the high intensity present at the laser focus results in non-linear absorption processes, whereby, depending on the laser parameters, different material modifications can be induced. These non-linear absorption processes generate free charge carriers, which in consequence effect quasi linear absorption. In this way, a plasma arises locally and forms the melting zone. If the modification is positioned in the region of the interface of two glasses, the cooling melt generates a stable connection between both glasses. Because of the very local joining process, the laser-induced stresses are typically low, as a result of which even glasses having greatly different thermal properties can be welded together. Moreover, other transparent materials such as crystals having in some instances even more greatly deviating thermal and mechanical properties can be welded to one another or to glasses using the new methods described herein.

According to the present disclosure, in the region of the cylindrical joining surface between optical fiber and perforated element, at least one weld seam is produced by an advance movement of the laser focus in or counter to the beam direction of the laser beam. The advance movement of the laser focus can be effected, for example, by a movement of the laser processing head in or counter to the beam direction of the laser beam and/or by an advance movement of optical fiber and perforated element in or counter to the beam direction of the laser beam. However, a change in focal length of the focusing optical unit is also possible.

In this case, the at least one weld seam has direction components in the axial direction of the optical fiber or of the cylindrical joining surface and is situated in the region of the joining surface of the optical fiber and the perforated element. The at least one weld seam can also have direction components in the circumferential direction of the optical fiber. For this purpose, a movement in the circumferential direction of the cylindrical joining surface can be superposed on the advance movement of the laser focus in or counter to the beam direction.

For a reliable joining connection, a plurality of weld seams spaced apart from one another in the circumferential direction of the joining surface can be produced. In some embodiments, the method begins in the region with the smallest joining gap and then proceeds further therefrom in an alternating manner. In this regard, the weld seam follows a weld seam that has already been joined in a stable manner. Experiments show that it is thereby possible to bridge even joining gaps which are larger than those which can be bridged by a single seam.

In some embodiments, the advance movement of the laser focus in or counter to the beam direction is effected continuously, but can also be effected step-by-step with or without pauses between the individual steps. In the latter case, welding without pauses has the effect that welding is effected in the material that is still hot from the preceding step, and welding with pauses has the effect that welding is effected in material that has already cooled down owing to the temporal delay with respect to the preceding step. As has been shown by experiments, e.g., continuous laser welding running counter to the beam direction results in a crack-free continuous weld seam.

In some embodiments, in the case of an advance counter to beam incidence direction, a continuous advance in the range of 0.5 mm/s to 100 mm/s, e.g., 5 mm/s to 30 mm/s, or at approximately 20 mm/s, is employed.

In some embodiments, a weld seam having a seam diameter of 5-500 µm, e.g., 50-100 µm, is produced during the welding.

To increase the tolerance range and the total weld seam width, at a circumferential position, instead of a single axial weld seam, in some embodiments a plurality of axial weld seams overlapping one another in a direction transversely with respect to the joining surface are produced sequentially.

It is possible to employ individual pulses during the welding. In some embodiments, pulse packets having a plurality of individual pulses are employed during the welding. A pulse train includes a number of individual pulses, where in the pulse train the individual pulses have an individual pulse repetition rate from pulse to pulse. Pulse packets include at least two individual pulses. There is also an individual pulse repetition rate here. Furthermore, there is also a pulse-packet-to-pulse-packet repetition rate. The individual pulses in a pulse packet can be identical. The number of individual pulses in a pulse packet is for example between 2 and 20, e.g., approximately 5. By way of example, the pulse-packet-to-pulse-packet repetition rates can be 50-200 kHz, e.g., approximately 125 kHz, and the average pulse power can be 1-20 W, e.g., approximately 10 W. The individual pulse repetition rate in the pulse packet can be a plurality of MHz.

The methods according to the present disclosure can find application for example in the welding of perforated caps, protective caps, or end caps on optical fibers or in adjusting joining, e.g., the mirrors of a multipass amplifier.

In another aspect, the present disclosure features optical elements joined together from optical fibers and perforated elements by the laser welding according to the present disclosure, where the optical fiber is arranged in a hole of the perforated element and the outer circumference of the optical fiber and the inner circumference of the hole of the perforated element form a cylindrical joining surface, and where the optical fiber and the perforated element are connected in the region of the cylindrical joining surface by at least one weld seam extending in an axial direction of the cylindrical joining surface.

In some embodiments, the optical fiber is formed from a glass structure, e.g., kagome structure, which surrounds a hollow interior. The hollow fiber core composed of a glass structure is surrounded by a fiber cladding. The perforated element can be composed of glass, e.g., a perforated block, ferrule/glass sleeve, or else a perforated disc or perforated cap.

The optical elements produced by the methods described herein have a weld seam in the region of the outer circumference of the cladding of the optical fiber. The weld seam extends, for example, in an axial or axially parallel direction with respect to the optical fiber or with respect to the cylindrical joining surface. The weld seam can also have direction components in the circumferential direction of the outer circumference of the fiber cladding.

Further advantages and advantageous configurations of the subject matter of the present disclosure are evident from the description, the claims and the drawing. Likewise, the features mentioned above and those presented further below can each be used by themselves or as a plurality in any desired combinations. The embodiments shown and described should not be understood as an exhaustive enumeration, but rather are of exemplary character for outlining the present disclosure.

DESCRIPTION OF DRAWINGS

FIGS. 3 and 4 are schematic diagrams that show a plan view of the end side of the optical fiber and of the perforated element with a plurality of axial weld seams (FIG. 3) spaced apart from one another in the circumferential direction of the cylindrical joining surface, and with additional sequentially produced axial weld seams (FIG. 4).

DETAILED DESCRIPTION

Figure 1B:
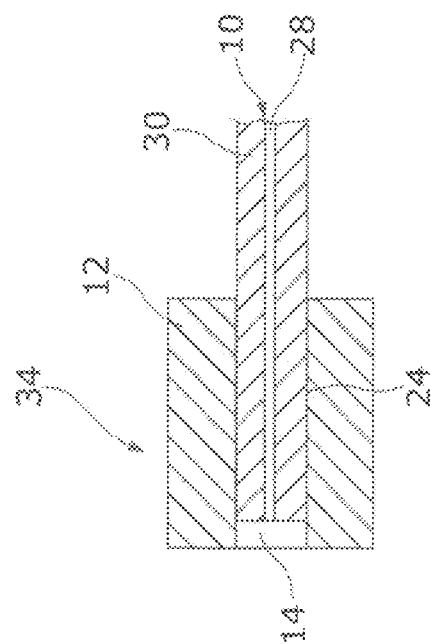
FIGS. 1A and 1B are schematic diagrams of a laser processing machine for laser welding of an optical fiber in a perforated element according to the present disclosure.
Figure 1A:
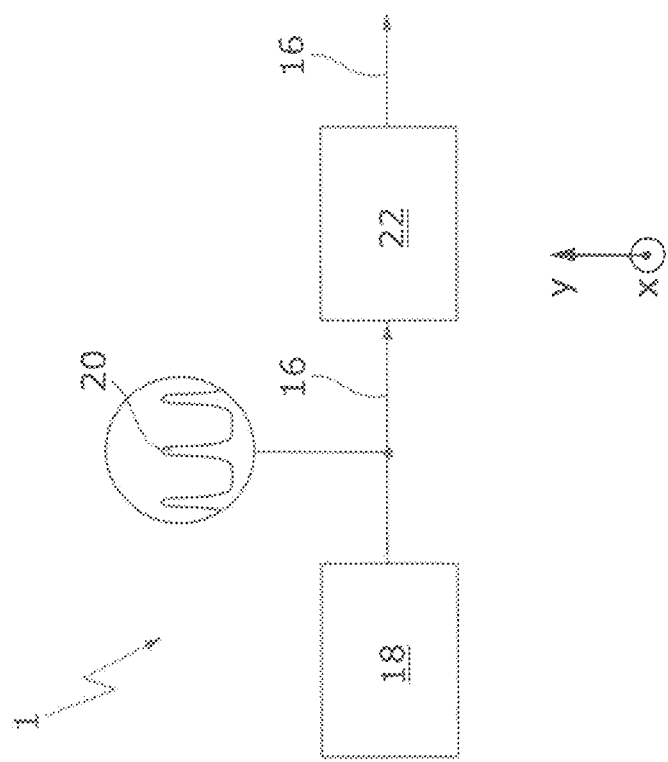

The laser processing machine 1 shown in FIG. 1A serves for welding the outer circumference of an optical fiber 10 to the inner circumference of the hole 14 in a perforated element (or perforated device or structure) 12 by a laser beam 16. The laser beam 16 can have a wavelength at which at least one joining partner is transparent or partially transparent. The optical fiber 10 can be composed of glass such as quartz glass, and the perforated element 12 can be formed from glass such as quartz glass, polymer, glass ceramic in crystalline fashion, or from combinations thereof, and/or with opaque materials.

The laser processing machine 1 includes a USP laser 18 for generating the laser beam 16 in the form of USP laser pulses 20 having pulse durations of less than 50 ps, e.g., less than 1 ps or in the form of femtosecond pulses, and also a laser processing head 22, which is movable in X-Y directions and from which the laser beam 16 emerges. Alternatively, or additionally, the assembly to be welded, composed of the optical fiber 10 and the perforated element 12, can also be moved.

After the optical fiber 10 has been inserted into the hole 14 in the perforated element 12 and positioned, as illustrated in FIG. 1B, the laser beam 16 is focused into the region of the cylindrical common joining surface 24 of optical fiber 10 and perforated element 12 to locally melt the optical fiber 10 and the perforated element 12 in the region of the joining surface 24 and thus to weld them to one another. In this case, the laser focus of the laser beam 16 oriented axially parallel to the optical fiber 10 or to the cylindrical joining surface 24 is moved in or counter to the beam direction of the laser beam 16, that is, in the axial direction of the cylindrical joining surface 24, to produce an axial weld seam 26 (FIG. 2) extending in the beam direction in the region of the joining surface 24. The laser focus F of the focused laser beam 16 is situated at the joining surface 24 or in proximity to the joining surface 24 in the volume of one of the two components 10, 12. In some embodiments, the vertical weld seam 26 extends almost over the entire thickness of the perforated element 12 and ends before the top side and undersides of the perforated element 12 in such a way that no escape of material arises and a clean process is conducted. This depends on the size of the weld seam 26 or welding bubbles.

In the exemplary embodiment illustrated, the optical fiber 10 is embodied merely by way of example as a hollow core fiber including a core 28 and a cladding 30.

Figure 2:
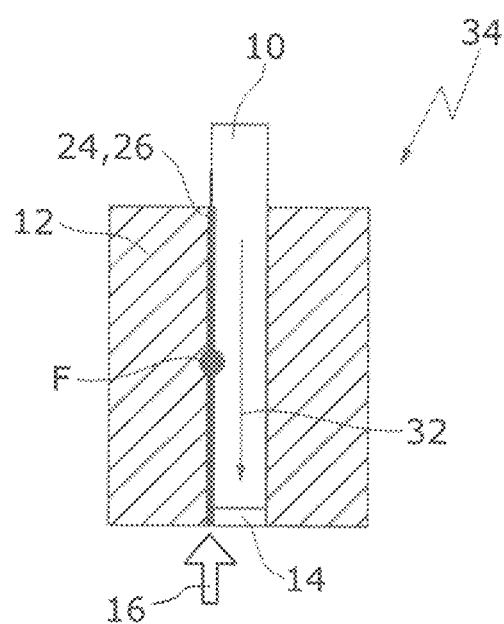
FIG. 2 is a schematic cross-sectional diagram of a longitudinal section through the optical fiber welded to a perforated element with an axial weld seam in the region of a cylindrical joining surface.

FIG. 2 schematically shows a longitudinal section through the optical fiber 10 welded to the perforated element 12 with an axial weld seam 26 formed in the region of the joining surface 24. The laser beam 16 impinges, in the axial direction of the optical fiber 10, on the joining surface 24 between the outer circumference of the optical fiber 10 and the inner circumference of the hole 14 in the perforated element 12. The laser focus F is moved in or, as shown in FIG. 2, counter to the beam direction (Z-direction) of the laser beam 16, thus resulting in an axial advance direction 32 of the laser focus F or a welding direction counter to the beam direction of the laser beam 16. The optical element (or optical device) thus formed is designated in its entirety by 34. FIG. 1B shows a cross-sectional view of the optical element 34 made by the laser processing machine 1.

In the case of the optical element 34 shown in FIG. 3, in the region of the cylindrical joining surface 24, as described above, a plurality of axial weld seams 26 spaced apart from one another in the circumferential direction of the cylindrical joining surface 24 have been produced, whereby the optical fiber 10 is welded in the perforated element 12.

As shown in FIG. 4, at a circumferential position instead of a single axial weld seam in each case a plurality of axial weld seams 26 can be produced sequentially next to one another, which overlap one another in direction 36 transversely with respect to the joining surface 24 to increase the total weld seam width and, as a result, the tolerance range.

OTHER EMBODIMENTS

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A method of welding an optical fiber to a perforated element by a pulsed laser beam, the method comprising:
    focusing the pulsed laser beam onto a region of a joining surface between the optical fiber and the perforated element, wherein the joining surface is formed by an outer circumference of the optical fiber and an inner circumference of a hole of the perforated element, and wherein a beam direction of the pulsed laser beam runs in an axial direction of the joining surface; and
    moving a laser focus of the pulsed laser beam in the region of the joining surface axially in or counter to the beam direction of the laser beam to produce at least one weld seam in the region of the joining surface,
    wherein the optical fiber and the perforated element are locally melted in the region of the joining surface by the pulsed laser beam focused into a material of the optical fiber and a material of the perforated element and are thereby welded to one another.

2. The method of claim 1, wherein a plurality of weld seams spaced apart from one another in a circumferential direction of the joining surface are produced in the region of the joining surface.

3. The method of claim 1, wherein moving the laser focus of the pulsed laser beam in the region of the joining surface axially in or counter to the beam direction of the laser beam comprises moving the laser focus of the pulsed laser beam axially in or counter to the beam direction continuously with an advance speed.

4. The method of claim 3, wherein the advance speed is in a range from 0.5 mm/s to 100 mm/s.

5. The method of claim 1, wherein moving the laser focus of the pulsed laser beam in the region of the joining surface axially in or counter to the beam direction of the laser beam comprises moving the laser focus of the pulsed laser beam axially in or counter to the beam direction step-by-step.

6. The method of claim 1, wherein the at least one weld seam comprises a weld seam having a seam diameter in a range from 5 µm to 500 µm.

7. The method of claim 6, wherein the seam diameter is in a range from 50 µm to 100 µm.

8. The method of claim 1, wherein a plurality of axial weld seams overlapping one another in a direction transverse to the joining surface are produced sequentially.

9. The method of claim 1, wherein the pulsed laser beam comprises laser pulse packets having individual pulses.

10. The method of claim 9, wherein the individual pulses in each of the laser pulse packets are identical.

11. The method of claim 9, wherein a number of individual pulses in each of the laser pulse packets is in a range between 1 and 20.

12. The method of claim 9, wherein laser pulses of the pulsed laser beam have one or more of:
    an individual pulse repetition rate in a pulse packet in a range of 50-200 kHz,
    an average pulse power in a range of 1-20 W, or
    a laser focus at a welding location having a size of 5-10 µm.

13. The method of claim 9, wherein the pulsed laser beam comprises ultrashort pulse laser radiation having a pulse duration of less than 50 ps.

14. The method of claim 13, wherein the pulse duration of the laser radiation is in a femtoseconds range.

15. The method of claim 1, further comprising:
    inserting the optical fiber into the hole of the perforated element to form the joining surface.

16. The method of claim 1, wherein the optical fiber comprises a hollow core fiber, and the perforated element is composed of glass.

\* \* \* \* \*